United States Patent
Flohr et al.

(10) Patent No.: US 11,635,034 B2
(45) Date of Patent: Apr. 25, 2023

(54) REGULATING METHOD FOR A CHARGED INTERNAL COMBUSTION ENGINE

(71) Applicant: MTU FRIEDRICHSHAFEN GMBH, Friedrichshafen (DE)

(72) Inventors: Andreas Flohr, Deggenhausertal (DE); Christof Kibele, Berg (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/328,970

(22) PCT Filed: Jul. 13, 2017

(86) PCT No.: PCT/EP2017/000840
§ 371 (c)(1),
(2) Date: Feb. 27, 2019

(87) PCT Pub. No.: WO2018/050265
PCT Pub. Date: Mar. 22, 2018

(65) Prior Publication Data
US 2019/0277209 A1    Sep. 12, 2019

(30) Foreign Application Priority Data
Sep. 19, 2016   (DE) ...................... 10 2016 011 305.7

(51) Int. Cl.
*F02D 33/02*    (2006.01)
*F02D 41/18*    (2006.01)
(Continued)

(52) U.S. Cl.
CPC .............. *F02D 33/02* (2013.01); *F02B 37/16* (2013.01); *F02B 37/18* (2013.01);
(Continued)

(58) Field of Classification Search
CPC ...... F02D 33/02; F02D 41/0007; F02D 41/18; F02D 2200/0404; F02D 2200/0406; F02B 37/16; F02B 37/18; Y02T 10/144
(Continued)

(56) References Cited

U.S. PATENT DOCUMENTS 4,220,993 A * 9/1980 Schloeman ............ G05D 1/063
60/39.15
4,337,839 A * 7/1982 Taplin ................... F02D 11/105
180/335
(Continued)

FOREIGN PATENT DOCUMENTS

CN      104053888 A    9/2014
DE      102005010792 A1    9/2006
(Continued)

*Primary Examiner* — Logan M Kraft
*Assistant Examiner* — John D Bailey
(74) *Attorney, Agent, or Firm* — Lucas & Mercanti, LLP; Klaus P. Stoffel

(57) ABSTRACT

A regulating method for a charged internal combustion engine, wherein an operating point of the compressor is adjusted in a compressor map by a compressor position regulator based on a throttle valve regulation deviation in that both a first manipulated variable for actuating the compressor bypass valve as well as a second manipulated variable for actuating the turbine bypass valve are calculated by the compressor position regulator. The operating point of the compressor is corrected by a correction regulator on the basis of an air mass regulation deviation in that both a first correction variable for correcting the first manipulated variable as well as a second correction variable for correcting the second manipulated variable are calculated by the correction regulator.

4 Claims, 3 Drawing Sheets

(51) Int. Cl.
*F02B 37/16* (2006.01)
*F02B 37/18* (2006.01)
*F02D 41/00* (2006.01)

(52) U.S. Cl.
CPC ......... *F02D 41/0007* (2013.01); *F02D 41/18* (2013.01); *F02D 2200/0404* (2013.01); *F02D 2200/0406* (2013.01); *Y02T 10/12* (2013.01)

(58) Field of Classification Search
USPC ........................................................ 701/103
See application file for complete search history.

(56) References Cited

U.S. PATENT DOCUMENTS

| | | | | |
|---|---|---|---|---|
| 4,346,776 | A * | 8/1982 | Taplin | F02D 11/105 |
| | | | | 180/335 |
| 6,041,273 | A * | 3/2000 | Burken | B64D 31/06 |
| | | | | 244/75.1 |
| 8,001,782 | B2 * | 8/2011 | Pursifull | F02D 41/0007 |
| | | | | 123/562 |
| 8,397,499 | B2 | 3/2013 | Chen | |
| 8,499,743 | B2 * | 8/2013 | Tripathi | F02D 41/1402 |
| | | | | 123/350 |
| 9,080,506 | B2 | 7/2015 | McConville et al. | |
| 9,890,718 | B2 * | 2/2018 | Tsunooka | F02D 23/00 |
| 2008/0201059 | A1 * | 8/2008 | Bryant | F02B 39/10 |
| | | | | 123/90.15 |
| 2011/0167816 | A1 * | 7/2011 | Tomita | F02B 77/082 |
| | | | | 60/602 |
| 2011/0208405 | A1 * | 8/2011 | Tripathi | F02D 41/1402 |
| | | | | 701/102 |
| 2011/0213540 | A1 * | 9/2011 | Tripathi | F02D 17/02 |
| | | | | 701/102 |
| 2013/0118443 | A1 * | 5/2013 | Tripathi | F02D 17/02 |
| | | | | 123/198 F |
| 2014/0158097 | A1 | 6/2014 | Anwar | |
| 2014/0278303 | A1 * | 9/2014 | Larimore | G06F 30/20 |
| | | | | 703/2 |
| 2014/0316675 | A1 | 10/2014 | Buckland | |
| 2014/0316676 | A1 * | 10/2014 | Pursifull | G01N 27/223 |
| | | | | 701/102 |
| 2014/0372091 | A1 * | 12/2014 | Larimore | G06F 30/20 |
| | | | | 703/2 |
| 2015/0047342 | A1 * | 2/2015 | McConville | F02B 37/025 |
| | | | | 60/273 |
| 2016/0305353 | A1 * | 10/2016 | Sase | F02D 41/30 |
| 2016/0369716 | A1 * | 12/2016 | Ossareh | F02D 41/0007 |
| 2017/0030260 | A1 * | 2/2017 | Nishio | F02D 41/2464 |
| 2017/0037786 | A1 * | 2/2017 | Fabien | F02D 9/02 |
| 2017/0122241 | A1 * | 5/2017 | Xiao | F02D 41/0007 |
| 2018/0038273 | A1 * | 2/2018 | Iwatani | F02D 41/2496 |
| 2018/0100456 | A1 * | 4/2018 | Yokono | F02B 39/10 |
| 2018/0297582 | A1 * | 10/2018 | Theiss | B60W 10/06 |

FOREIGN PATENT DOCUMENTS

| | | |
|---|---|---|
| DE | 102014215180 A1 | 2/2015 |
| EP | 0685638 A2 | 12/1995 |
| FR | 2864579 A1 | 7/2005 |

* cited by examiner

REGULATING METHOD FOR A CHARGED INTERNAL COMBUSTION ENGINE

CROSS-REFERENCE TO RELATED APPLICATIONS

The present application is a 371 of International application PCT/EP2017/000840, filed Jul. 13, 2017, which claims priority of DE 10 2016 011 305.7, filed Sep. 19, 2016, the priority of these applications is hereby claimed and these applications are incorporated herein by reference.

BACKGROUND OF THE INVENTION

The invention relates to a regulating method for a supercharged internal combustion engine, in which regulating method an operating point in the compressor characteristic map is defined by means of the adjustment of a compressor bypass valve and of a turbine bypass valve.

DE 10 2014 215 180 A1 discloses a method for a single-stage supercharged internal combustion engine having a compressor bypass valve and a turbine bypass valve. The method is based on a typical compressor characteristic map which maps an assignment of air mass flow to charging pressure. An impermissible operating region of strong compressor pumping and a region of weak compressor pumping are illustrated within the compressor characteristic map. The method involves ascertaining the position of the operating point in the compressor characteristic map after a throttle valve is released and actuating the compressor bypass valve and the turbine bypass valve depending on said position. If, for example, it is established that the operating point is situated in the region of weak pumping, the compressor bypass valve is opened further and additionally the turbine bypass valve is opened to a lesser extent. Although the method solves the problem of compressor pumping after an accelerator pedal is released, improvements are still required, for example, in respect of the degree of efficiency.

SUMMARY OF THE INVENTION

Therefore, the invention is based on creating a regulating method fora single-stage supercharged internal combustion engine having a compressor bypass valve and a turbine bypass valve with an optimized degree of efficiency.

In the regulating method according to the invention, an operating point of the compressor in a compressor characteristic map is adjusted by means of a compressor position regulator depending on a throttle valve regulation deviation by way of both a first actuating variable for actuating the compressor bypass valve and also a second actuating variable for actuating the turbine bypass valve being calculated by means of the compressor position regulator. In addition, the operating point of the compressor is corrected by means of a correction regulator depending on an air mass regulation deviation by way of both a first correction variable for correcting the first actuating variable and also a second correction variable for correcting the second actuating variable being calculated by means of the correction regulator. The operating point in the compressor characteristic map is regulated to a characteristic curve of optimum operating points by means of the correction regulator. Specifically, the characteristic curve of optimum operating points runs through the areas of the best-possible degrees of efficiency.

A first region is defined in the compressor characteristic map by means of the characteristic curve of optimum operating points and the surge limit. If, for example, an operating point now lies in the first region, the opening of the compressor bypass valve is increased and the opening of the turbine bypass valve is reduced by means of the correction regulator. The correction variables calculated by the correction regulator therefore have opposing effects on the two actuating variables.

The invention allows a single-stage supercharging concept with a small exhaust gas turbocharger together with a small turbine. Since there is a charging pressure excess up to the full-load curve at virtually all operating points, this excess is initially throttled by means of the throttle valve. On account of the high pressure ratios at the compressor, pure throttle valve regulation is not possible, so that the excess charging pressure is reduced by means of the compressor bypass valve and the turbine bypass valve. Pumping in a low rotational speed range and stopping of the compressor in the upper rotational speed range can be avoided only in this way. Therefore, it is advantageous for a wide compressor characteristic map to be able to be presented with single-stage supercharging.

On account of the air mass regulation, the regulating method automatically correctly responds to changes in the ambient conditions, such as the geodetic height or the ambient temperature for example. It should be noted that there is a low level of expenditure on handling data with just one characteristic map. A continuous transition is ensured by way of the compressor position regulator having access both to the compressor bypass valve and also to the turbine bypass valve.

In addition, transient processes are correctly interpreted, so, for example, in the event of load connection, the missing throttle valve reserve is counteracted by the compressor bypass valve and the turbine bypass valve being closed. The method can be employed both in the case of a diesel engine and a gas engine.

BRIEF DESCRIPTION OF THE DRAWING

A preferred exemplary embodiment is illustrated in the figures, in which.

DETAILED DESCRIPTION OF THE INVENTION

Figure 1:
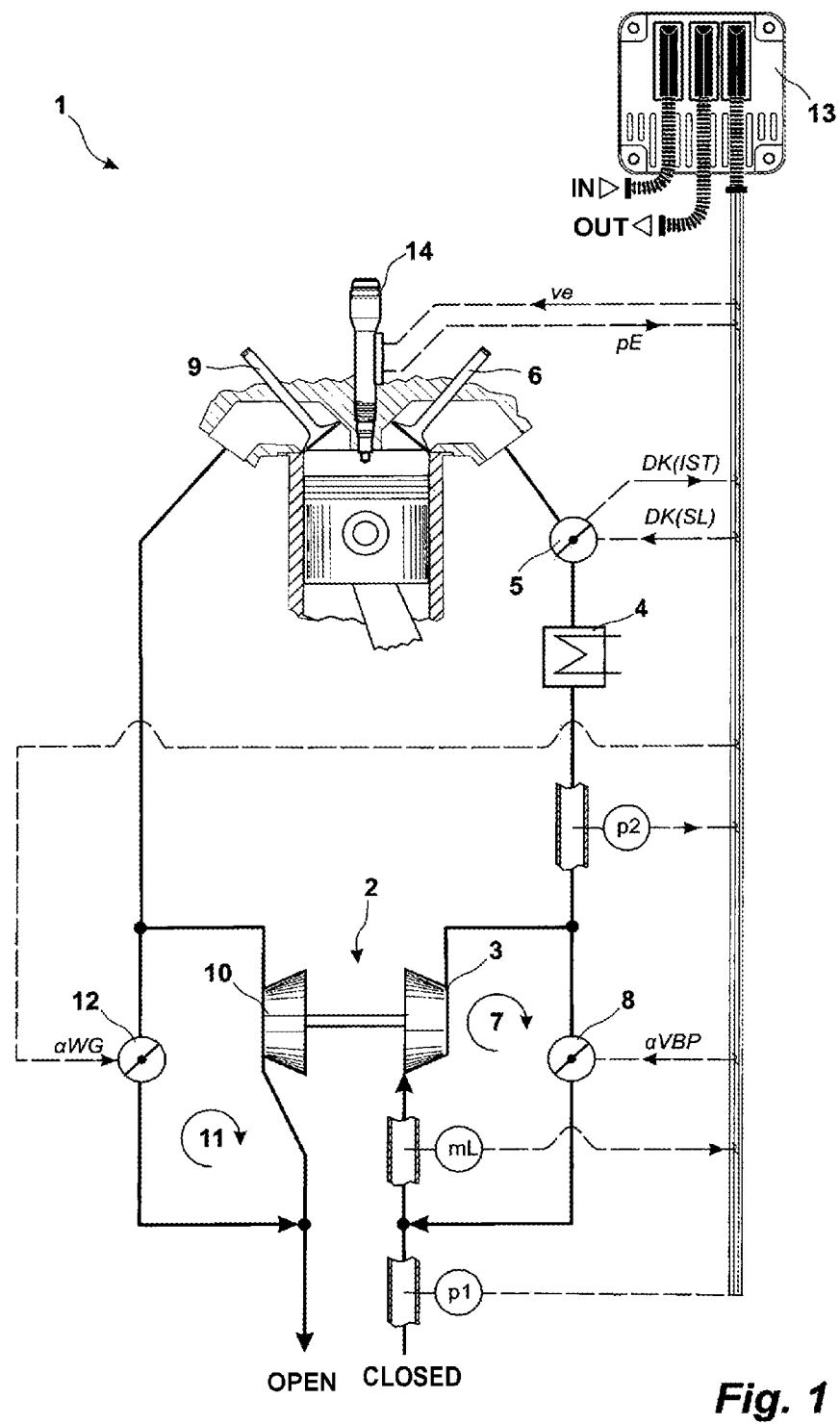
FIG. 1 shows a system diagram.

FIG. 1 shows a reduced system diagram of an internal combustion engine 1 having an exhaust gas turbocharger 2. The exhaust gas turbocharger 2 comprises a compressor 3 and a turbine 10. The further structure and the functioning of the exhaust gas turbocharger 2 are assumed to be known. The air path for supplying combustion air comprises the compressor 3, a charge air cooler 4, a throttle valve 5 and an inlet valve 6 in the cylinder head of the internal combustion engine 1. The air path is supplemented by a compressor bypass 7 having a compressor bypass valve 8. The charge air is returned from the secondary side of the compressor 3 to the primary side of the compressor 3 by means of the compressor bypass 7. The exhaust gas path comprises an outlet valve 9 in the cylinder head of the internal combustion engine 1 and the turbine 10. The exhaust gas path is supplemented by a turbine bypass 11 having a turbine bypass valve 12.

The internal combustion engine 1 is controlled and regulated by means of an electronic engine control unit 13. The input signals to the electronic engine control unit 13 illustrated are: a pressure level p1 of the primary side of the compressor 3, an air mass mL on the secondary side of the compressor 3, a pressure level p2 of the charge air, an actual throttle valve value DK(IST) of the throttle valve 5 and optionally the pressure level pE of the fuel in the injector 14. Reference symbol IN denotes the further input signals, for example an engine rotational speed. The output signals from the electronic engine control unit 13 illustrated in FIG. 1 are: a first actuating variable αVBP for actuating the compressor bypass valve 8, a second actuating variable αWG for actuating the turbine bypass valve 12, a setpoint throttle valve value DK(SL) for actuating the throttle valve 5 and a signal ve for actuating the injector 14, for example start of injection or end of injection. The angular position of the compressor bypass valve 8 is prespecified by means of the first actuating variable αVBP. The angular position of the turbine bypass valve 12 is prespecified by means of the second actuating variable αWG. If a linear actuator is used instead of a valve, then both the first actuating variable αVBP and also the second actuating variable αWG correspond to an actuating path. Reference symbol OUT denotes the further output signals for controlling and regulating the internal combustion engine 1, for example the actuating signal for an intake throttle in the case of a common rail system.

Figure 2:
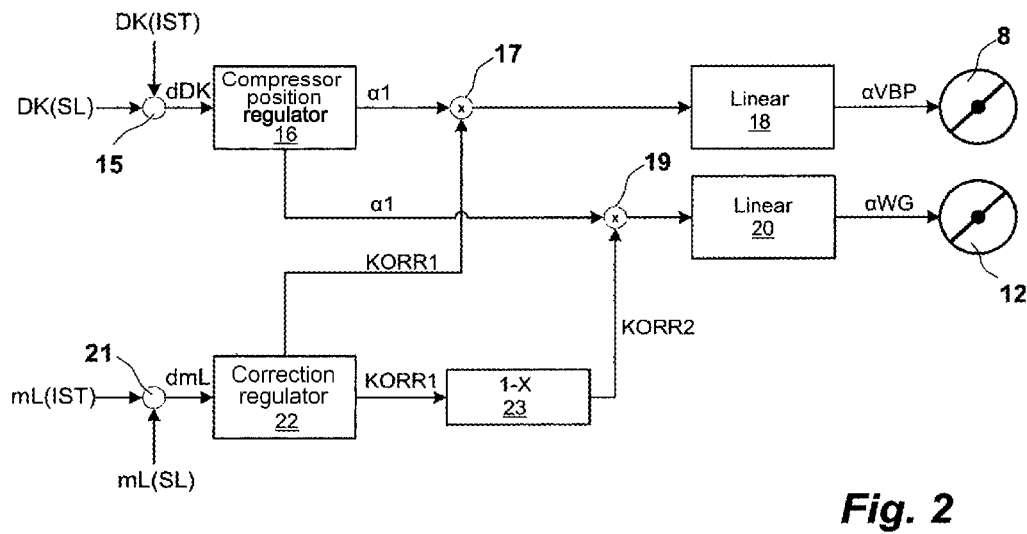
FIG. 2 shows a block diagram.

FIG. 2 shows a block diagram, wherein the individual blocks represent program parts of a program which can be executed. The input variables are the setpoint throttle valve value DK(SL), the actual throttle valve value DK(IST), the setpoint air mass mL(SL) and the actual air mass mL(IST). In the case of a diesel engine without throttle valve control, the setpoint value and actual value of the pressure level of the charge air p2 are used instead of the throttle valve values. The output variables are the first actuating variable αVBP for actuating the compressor bypass valve 8 and the second actuating variable αWG for actuating the turbine bypass valve 12. The throttle valve regulation deviation dDK is calculated from the setpoint/actual deviation of the throttle valve at a summation point 15. A compressor position regulator 16, typically using PID control, calculates a first angular value α1 from the throttle valve regulation deviation dDK. The first angular value α1 is multiplied by a first correction variable KORR1 at a multiplication point 17 and then linearized by means of a function block 18. The output value then corresponds to the first actuating variable αVBP with which the compressor bypass valve 8 is actuated. The compressor position regulator 16 has a second signal path for the first angular value α1. The first angular value α1 is multiplied by a second correction variable KORR2 at a multiplication point 19 and then linearized by means of a function block 20. The output value corresponds to the second actuating variable αWG with which the turbine bypass valve 12 is actuated.

An air mass regulation deviation dmL is calculated from the setpoint/actual deviation of the air mass at a summation point 21. A correction regulator 22, typically using PID control, then calculates the first correction variable KORR1 from the air mass regulation deviation. The first correction variable KORR1 has a value between zero and one. The first correction variable KORR1 has a multiplicative effect on the first angular value α1 (multiplication point 17) and therefore also determines the first actuating variable αVBP. A difference from one is calculated from the first correction variable KORR1 by means of a differential element 23. The output value corresponds to the second correction variable KORR2 which can likewise assume a value between zero and one. The second correction variable KORR2 has a multiplicative effect on the first angular value α1 and therefore determines the second actuating variable αWG. The differential element 23 has the effect that the first actuating variable αVBP and the second actuating variable αWG achieve an opposing effect. In other words: if, for example, the compressor bypass valve is moved in the opening direction, the turbine bypass valve is operated in the closing direction.

Figure 3:
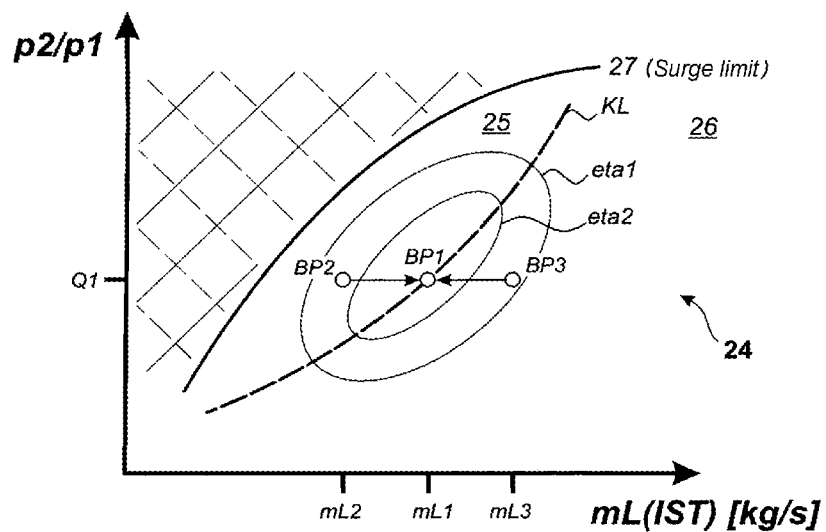
FIG. 3 shows a compressor characteristic map.

FIG. 3 illustrates a compressor characteristic map 24. The actual air mass mL(IST) is plotted on the abscissa and the compression ratio, that is to say the quotient of the pressure level p2 on the secondary side of the compressor and of the pressure level p1 on the primary side of the compressor, is plotted on the ordinate. The surge region, which is delimited by the surge limit 27, is illustrated by hatching. Areas of a constant degree of efficiency, reference symbols eta1 and eta2, are marked in the permissible region, that is to say outside the surge region. A characteristic curve KL of optimum operating points is positioned through these areas of degree of efficiency. Therefore, for example, the operating point BP1 comprising the value pair mL1/Q1 is situated on this characteristic curve KL. A first region 25 is defined by the surge limit and the characteristic curve KL. A second region 26 is located to the right of the characteristic curve KL in the direction of greater actual air mass values. The operating point BP2 is situated in the first region 25 and is defined by means of the value pair mL2/Q1. In this case, the compressor bypass valve is adjusted in the opening direction and the turbine bypass valve is adjusted in the closing direction by means of the correction regulator. As a consequence of this, the operating point BP2 is adjusted in the direction of the operating point BP1. The operating point BP3 lies in the second region 26 and is defined by the value pair mL3/Q1. In this case, the compressor bypass valve is adjusted in the closing direction and the turbine bypass valve is adjusted in the opening direction by means of the correction regulator.

Figure 4:
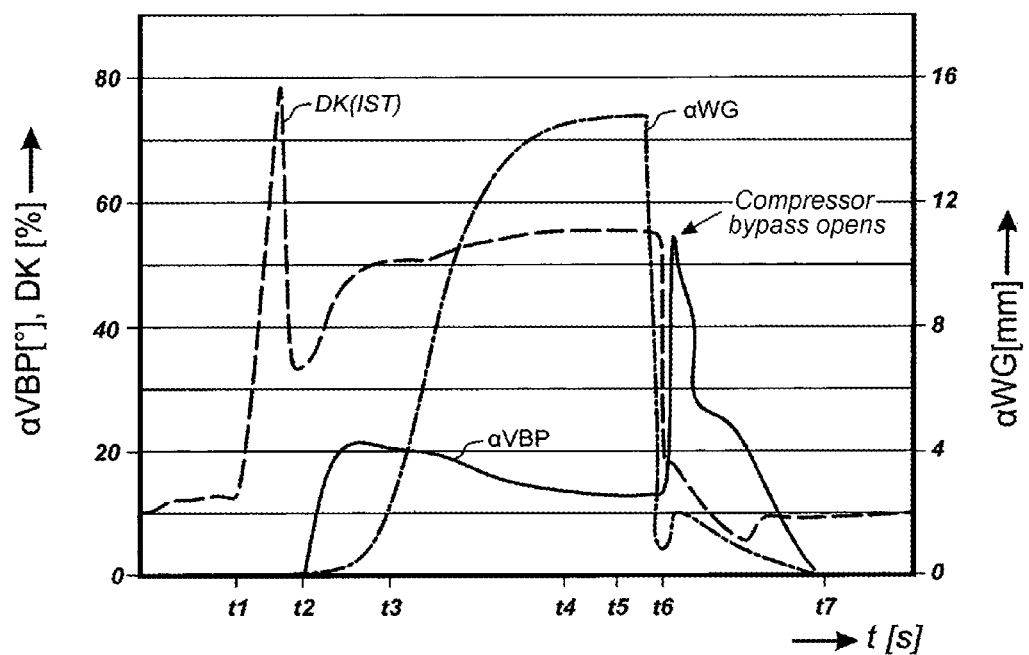
FIG. 4 shows a time graph.

FIG. 4 shows a time graph. The first actuating variable αVBP for actuating the compressor bypass valve in degrees and the throttle valve value in percent are plotted on the left-hand-side ordinate. The second actuating variable αWG for actuating the turbine bypass valve is plotted on the right-hand-side ordinate. The following signals are illustrated over time: the actual throttle valve value DK(IST) as a dashed line, the first actuating variable αVBP as a solid line, and the second actuating variable αWG as a dash-and-dot line. Three different operating states are illustrated in the time graph, specifically load connection in time period t1-t3, a steady state in time period t3-t5, and load shedding in time period t5-t7. Load connection is initiated at time t1.

The throttle valve regulation means responds to this by fully opening the throttle valve, value of approximately 80%, followed by reduction. The throttle valve is then adjusted to the correct setpoint value in time period t2 to t3. At time t2, it is established that the operating point in the compressor characteristic map lies in the first region (FIG. 3: BP2). Therefore, the compressor bypass valve is opened by means of the correction regulator, that is to say the correction regulator corrects the operating point until said operating point lies on the characteristic curve of optimum operating points. The profile of the first actuating signal αVBP reflects this situation. In the illustrated example, it is then assumed that, starting from time t3, the operating point lies in the second region of the compressor characteristic map. The correction regulator responds to this by way of then moving the turbine bypass valve in the opening direction by means of the second actuating variable αWG and operating the compressor bypass valve in the closing direction by means of the first actuating variable αVBP. The system is then steady at time t4.

Load disconnection is triggered at time t5. Therefore, the throttle valve is fully closed at time t6. Since the operating point now lies in the first region of the compressor characteristic map, the compressor bypass valve is fully opened and the turbine bypass valve is closed. This is correspondingly identified in the graph. The system is again in the steady state after time t7.

REFERENCE SYMBOLS

1 Internal combustion engine
2 Exhaust gas turbocharger
3 Compressor
4 Charge air cooler
5 Throttle valve
6 Inlet valve
7 Compressor bypass
8 Compressor bypass valve
9 Outlet valve
10 Turbine
11 Turbine bypass
12 Turbine bypass valve
13 Electronic engine control unit (ECU)
14 Injector
15 Summation point
16 Compressor position regulator
17 Multiplication point
18 Function block
19 Multiplication point
20 Function block
21 Summation point
22 Correction regulator
23 Differential element
24 Compressor characteristic map
25 First region (compressor characteristic map)
26 Second region (compressor characteristic map)
27 Surge limit

The invention claimed is:

1. A regulating method for a supercharged internal combustion engine, the method comprising the steps of: adjusting an operating point of a compressor in a compressor characteristic map by a compressor position regulator depending on a throttle valve regulation deviation by way of both a first actuating variable for actuating a compressor bypass valve and also a second actuating variable for actuating a turbine bypass valve being calculated by the compressor position regulator; and correcting the operating point of the compressor by a correction regulator distinct from the compressor position regulator depending on an air mass regulation deviation, including calculating with the correction regulator both a first correction variable for correcting the first actuating variable and also a second correction variable for correcting the second actuating variable, further including multiplying an angular value of the throttle valve regulation deviation by the first correction variable to correct the first actuating variable and multiplying the angular value of the throttle valve regulation deviation by the second correction variable to correct the second actuating variable.

2. The method according to claim 1, including regulating the operating point in the compressor characteristic map to a characteristic curve of optimum operating points by the correction regulator.

3. The method according to claim 2, wherein a first region in the compressor characteristic map is defined by the characteristic curve and a surge limit, and an opening of the compressor bypass valve is increased and also an opening of the turbine bypass valve is reduced by the correction regulator at an operating point in the first region.

4. The method according to claim 3, including reducing the opening of the compressor bypass valve and increasing the opening of the turbine bypass valve by the correction regulator at an operating point in a second region of the compressor characteristic map.

\* \* \* \* \*